United States Patent [19]

Nakamura

[11] Patent Number: 4,660,037
[45] Date of Patent: Apr. 21, 1987

[54] CURRENT LOCATION INDICATION APPARATUS FOR USE IN AN AUTOMOTIVE VEHICLE

[75] Inventor: Yukinobu Nakamura, Saitama, Japan

[73] Assignee: Honda Giken Kogyo Kabushiki Kaisha, Tokyo, Japan

[21] Appl. No.: 461,132

[22] Filed: Jan. 26, 1983

[30] Foreign Application Priority Data

Jan. 28, 1982 [JP] Japan ............................. 57-12004
Mar. 3, 1982 [JP] Japan ............................. 57-33411

[51] Int. Cl.⁴ .............................................. H04N 7/18
[52] U.S. Cl. ...................................... 340/990; 340/988; 340/995; 364/443; 364/449
[58] Field of Search .................. 340/988, 990, 995; 353/12; 358/102, 103; 364/443, 447, 424, 448, 449, 454, 457, 521

[56] References Cited

U.S. PATENT DOCUMENTS

| | | | |
|---|---|---|---|
| 3,789,198 | 1/1974 | Henson | 340/990 |
| 4,152,693 | 5/1979 | Ashworth | 340/990 |
| 4,231,093 | 10/1980 | LaVance | 364/443 |
| 4,360,876 | 11/1982 | Girault | 340/995 |
| 4,400,727 | 8/1983 | Aron | 340/995 |
| 4,400,780 | 8/1983 | Nagao | 340/988 |
| 4,484,192 | 11/1984 | Seitz | 364/449 |
| 4,490,717 | 12/1984 | Saito | 340/995 |
| 4,494,201 | 1/1985 | Reymond | 340/995 |
| 4,499,491 | 2/1985 | Aron | 358/102 |
| 4,527,155 | 7/1985 | Yamaki | 340/995 |
| 4,535,334 | 8/1985 | Tagami | 340/995 |

*Primary Examiner*—Gerald L. Brigance
*Attorney, Agent, or Firm*—Irving M. Weiner; Joseph P. Carrier; Pamela S. Burt

[57] ABSTRACT

A current location indicating apparatus for use in an automotive vehicle which comprises a current travel distance detection unit adapted to detect a current cumulated travel distance of the automotive vehicle, a bearing detection unit adapted to detect a current bearing or heading of the vehicle following the current travel distance of the vehicle, a signal processing unit adapted to obtain a current locational point in terms of two-dimensional coordinates of the moving vehicle in accordance with the outputs from the detection unit and control the entire system, a path of travel store unit adapted to sequentially store the locational data in terms of the two-dimensional coordinates varying from time to time which are obtained from the signal processing unit and hold the contents thereof as current continuous locational information on the moving vehicle, a map or geographic image information store medium unit adapted to preliminarily store the map information prepared pixel by pixel in the raster mode, a store medium regeneration unit adapted to read out the required map information from the store medium unit, a display unit adapted to visually indicate a map or geographic image in accordance with the current read-out map information and display with a marking showing the state of travel of the vehicle on the same display screen in accordance with the locational data stored in the path of travel store unit, and a manual operating unit adapted to selectively specify an area map desired to be shown on the display screen of the display means and properly initialize the marking of indication on the display.

3 Claims, 12 Drawing Figures

CURRENT LOCATION INDICATION APPARATUS FOR USE IN AN AUTOMOTIVE VEHICLE

BACKGROUND OF THE INVENTION

1. Field of the Invention

The present invention relates generally to an apparatus for visually indicating a current location of a vehicle. More particularly, the invention relates to an improved apparatus for electronically determining and visually indicating a current location of an automotive vehicle and the like so as to provide a visual display of combined information on a current status of the vehicle, such as a current location, a path of travel, etc., for the driver or operator of the vehicle.

2. Description of Relevant Art

In order to prevent the driver or operator of an automotive vehicle or the like from losing his way while driving such as at night or in unfamiliar surroundings away from his desired route of travel, there have been proposed a variety of apparatus which are specifically designed to provide the driver with suitable ready guidance relating to the vehicle's current status of travel with reference to the desired course of travel from time to time during travel, by indicating continuously or discretely a due current position or the like information on the vehicle by way of an indication panel or display screen including a related area or road map or the like disposed at the driver's seat.

With respect to the conventional apparatus for visually indicating a current location of an automotive vehicle for use as described above, in a typical construction a current travel distance of a vehicle is detected by way of distance detecting means in accordance with the vehicle's current travel speed and travel time, and a current bearing and a current quantity of azimuthal deviation of the vehicle are detected by bearing detecting means. A current location of the vehicle along its travel route is obtained from arithmetical operation on the basis of the thus-obtained route detection data, the result of which arithmetic operation is stored for visual indication on a display in the form of spot information which varies from time to time during travel of the vehicle, on a display screen on which there has been previously disposed a suitable road map which may be printed on a transparent sheet or the like. The driver of the vehicle may thereby comparatively review the thus-indicated visual information and the geographical indication by way of the map sheet so as to visually confirm the current location of the vehicle along its travel route.

With such a typical construction of the apparatus for use as described above, however, it is commonly required of the driver to select in advance a specific map sheet suitable for his particular route of travel or location from amongst a multiplicity or set of maps for placement upon the display screen. Such selection can prove to be an intricate and troublesome job which is likely to become more burdensome when a plurality of map sheets must be replaced during a relatively long distance trip. Further, it is possible that the map sheet may become loose and slip away from its due position upon the display screen, thus resulting in an improper or erroneous indication of a current location of the vehicle, and possibly even total uselessness.

The present invention effectively overcomes the above-described inconveniences and difficulties attendant the conventional location detecting apparatus for use in an automotive vehicle.

SUMMARY OF THE INVENTION

The present invention provides an improved current location indicating apparatus for use in an automotive vehicle wherein a map of an extended area is preliminarily stored in the form of digital information taken pixel by pixel in the raster mode in a memory medium, instead of a plurality of physical map sheets being placed manually upon the display screen, and wherein a map of a specific area corresponding to the area that the vehicle driver wishes to travel is subsequently read out upon the display screen.

When stopping the vehicle for the purpose of parking or the like during the course of travel, the ignition switch of the engine is normally turned off in order to prevent the battery from discharging, which shuts off the power supply to known location detecting apparatus on the vehicle, thus naturally resulting in the loss of electronic records or data on a current path of travel, a current location, etc. of the vehicle which have been cumulatively stored in the memory means. Therefore, with the power supply connection of the conventional arrangement, it would be necessary to again initialize the setting of a new starting point and travel direction of the vehicle on the display screen prior to the starting-up of the vehicle, resulting in a troublesome procedure to be performed by the driver each time the vehicle is stopped with the engine switch being turned off.

In this respect, it is another object of the present invention to provide an improved automobile location indicating apparatus wherein a current status of travel of the vehicle can be shown without any interruption on the originally set map data even after the re-starting of the vehicle with the engine switch having been shut off once, without the fear of losing any cumulated data on the current path of travel, present location, travel direction, etc., of the vehicle.

According to the present invention, there is provided an improved current location indicating apparatus for use in an automotive vehicle which comprises current travel distance detection means for detecting a current cumulated travel distance of the automotive vehicle, bearing detection means for detecting a current bearing or heading of the vehicle following the current travel distance of the vehicle, signal processing means for obtaining a current locational point in terms of two-dimensional coordinates of the moving vehicle in accordance with the outputs from the detection means while controlling the entire system, and path of travel store means for sequentially storing the locational data in terms of the two-dimensional coordinates varying from time to time which are obtained from the signal processing means and for holding the contents thereof as current continuous locational information on the moving vehicle. Also provided are map or geographic image information store medium means for preliminarily storing the map information prepared pixel by pixel in the raster mode, store medium regeneration means for reading out the required map information from the store medium means, display means for visually indicating a map or geographic image in accordance with the current read-out map information and displaying with a marking showing the state of travel motion of the vehicle on the same display screen in accordance with the locational data stored in the path of travel store means, and manual operating means for selectively specifying an area map desired to be shown on the display screen of the display means and properly initializing the marking of indication on the display.

The above and further objects, details and advantages of the present invention will become apparent from the following detailed description of preferred embodiments of the invention, when read in conjunction with the accompanying drawings.

DETAILED DESCRIPTION OF PREFERRED EMBODIMENTS

Figure 1:
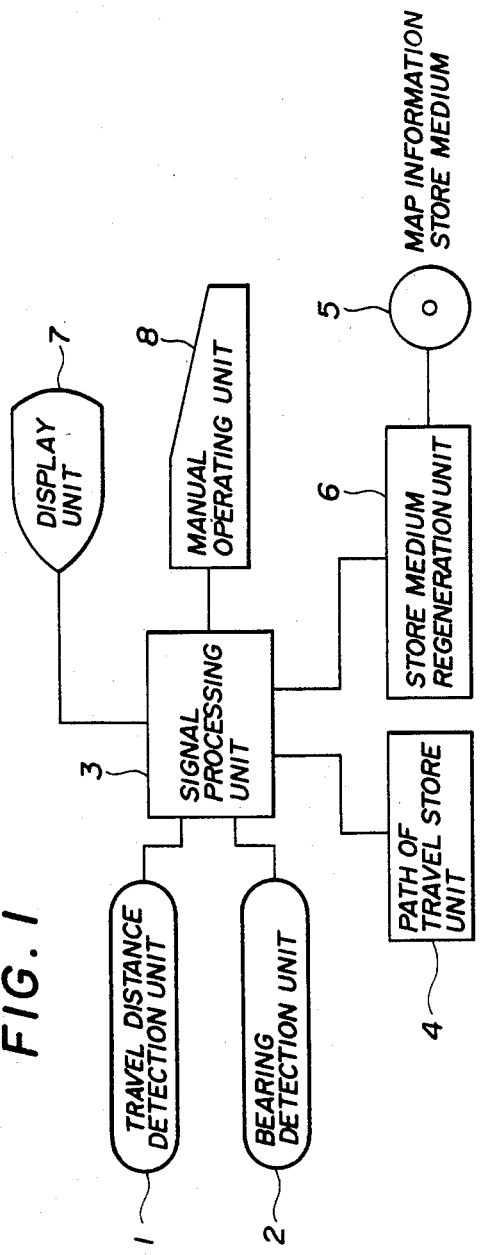
FIG. 1 is a schematic block diagram showing the basic construction of the current location indicating apparatus according to a first preferred embodiment of the present invention.

With reference to FIG. 1, there is shown an improved current location indicating apparatus for use in an automotive vehicle according to the present invention, which comprises, by way of a preferred embodiment thereof, a travel distance detection unit 1 which is adapted to generate an electric pulse signal corresponding to a current travel distance of a vehicle. The travel distance detection unit 1 comprises a sensor of the photoelectric, electromagnetic or mechanical contact type for producing an electric pulse proportional to, for example, the current number of revolutions of the wheels of the vehicle. A bearing or azimuth detection unit 2 is adapted to output an electric signal proportional to a current bearing or a current amount of azimuthal deviation of the vehicle corresponding to a current travel direction thereof with respect to a rate type gyroscope adapted to detect an angular velocity in the yawing plane. A signal processing unit or central processing unit (CPU) 3 is adapted to count the electric pulses from the distance detection unit 1 so as to measure the current travel distance of the vehicle, determine the current travel direction of the vehicle from the output of the bearing detection unit 2, and arithmetically operate to obtain a current positional data or values in terms of two-dimensional coordinates at an interval of a unit travel distance of the vehicle in accordance with the detection signals from both the detection units 1 and 2, while controlling the entire apparatus. A path of travel store unit or random access memory (RAM) 4 is adapted to sequentially store data on the discrete positional data or spots in terms of the two-dimensional coordinates which vary from time to time during travel of the vehicle and are obtained by the signal processing unit 3 as described above, and hold the data as finite and continuous information on the positions corresponding to the current location of the vehicle. A map or geographical information store medium 5 is adapted to store all of the geographic information converted in advance to the form of digital data pixel by pixel in the raster mode. A regeneration unit 6 for the store medium 5 is adapted to read out the geographical information required from time to time during travel of the vehicle. A display unit 7, such as a CRT display, is adapted to visually indicate information as undated from time to time following the vehicle's travel, such as on a current location of the vehicle, a current path of travel up to the current location thereof, a current travel direction thereof, etc., in accordance with a current cumulated locational data stored in the path of travel store unit 4 as described above. A manual operating unit 8 is adapted to give a command of indication to the signal processing unit 3, specify the selection of a road map desired to be indicated on the display unit 7, modify an appropriate setting such as of a directional change of the path of travel of the vehicle to be indicated on the display, a shift of the position of such indication, a partially enlarged indication of the road map and the current path of travel, a manual selection of a scale of indication on the display, etc., and accordingly retrieve the area maps and the vehicle's path of travel to be displayed.

The operation of the above-described construction of the vehicle's current location indicating apparatus according to the present invention is as follows.

In operation, prior to the start-up of the vehicle, the driver or operator of the vehicle specifies a map of an area by selecting, for example, a due number thereof upon which he wishes to travel in the vehicle, by way of the manual operating unit 8. Upon the selection of a due area map, the signal processing unit 3 operates to read the specified map information in the proper memory block from the map information store medium 5 through the store medium regeneration unit 6 in accordance with the given address specifying input for the selection of the due area as desired, so as to deliver the thus-obtained map information to the display unit 7 and visually indicate the map of the area that is required for the vehicle's travel to be shown on the display screen. Concurrently, the signal processing unit 3 operates to store the thus-obtained map information from the store medium 5 in the RAM 4 incorporated therein, from which the information is constantly ready to be delivered to the display unit 7, whereby any maps as required to be displayed can accordingly be ready for indication in succession on the screen of the display unit 7.

With respect to access means to a map to be displayed on the screen, it will be understood that any such means for selecting a required road map for the area to be travelled by the vehicle may be adapted by manual keying operation at the manual operating unit 8, while indicating in succession a plurality of area maps as stored in the store medium 5.

Next, as initialization procedures, marks both for indicating a current location of the vehicle and for showing a desired direction of travel at the current starting location are indicated respectively on the display screen of the display unit 7 by way of the keying operation on the operating unit 8, and then the mark for indicating the current location of the vehicle is to be shifted manually over to the starting point on the surface of the map shown in the screen by the operator's manual keying operation at the manual operating unit 8. At the same time, the direction indicating mark is to be adjusted in rotation so that it may coincide with the actual direction of the vehicle at the starting point. With this adjustment, the initialization procedures of both marks are completed. Incidentally, if the bearing detection unit 2 is of a magnetism compass type which can detect the absolute orientation in itself, it is not necessary to conduct the initialization of the bearing indicating mark as described above.

After such procedures are completed, and when the vehicle starts its travel, the current location indicating apparatus according to the invention operates to deliver a single electric pulse signal at an interval of unit travel distance from the travel distance detection unit 1 to the signal processing unit 3, where the number of pulses is counted so as to measure a current travel distance of the vehicle, while also sending the output from the bearing detection unit 2 to the signal processing unit 3 so as to determine a current travel direction of azimuth of the vehicle at each moment during travel of the vehicle. Next, the signal processing unit 3, as described above, operates to arithmetically obtain from time to time a current location or graphic point (x, y) on the X-Y coordinates in the preselected scale of indication on the display screen of the display unit 7 in accordance with the current travel distance and azimuthal deviation of the vehicle which have been detected in the manner described above, the results of which operation are sequentially sent to the display unit 7, and also to the path of travel store unit (RAM) 4 so as to be stored therein. The thus-stored contents are ready to be read out constantly so as to be fed into the display unit 7, in succession. At the same time, an azimuthal signal at a current location of the vehicle is sequentially sent out from the signal processing unit 3 to the display unit 7.

Figure 2:
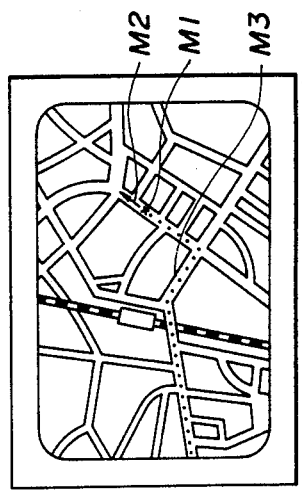
FIG. 2 is a schematic view showing a typical example of a map indication on the display screen according to the first embodiment of the invention.
Figure 3:
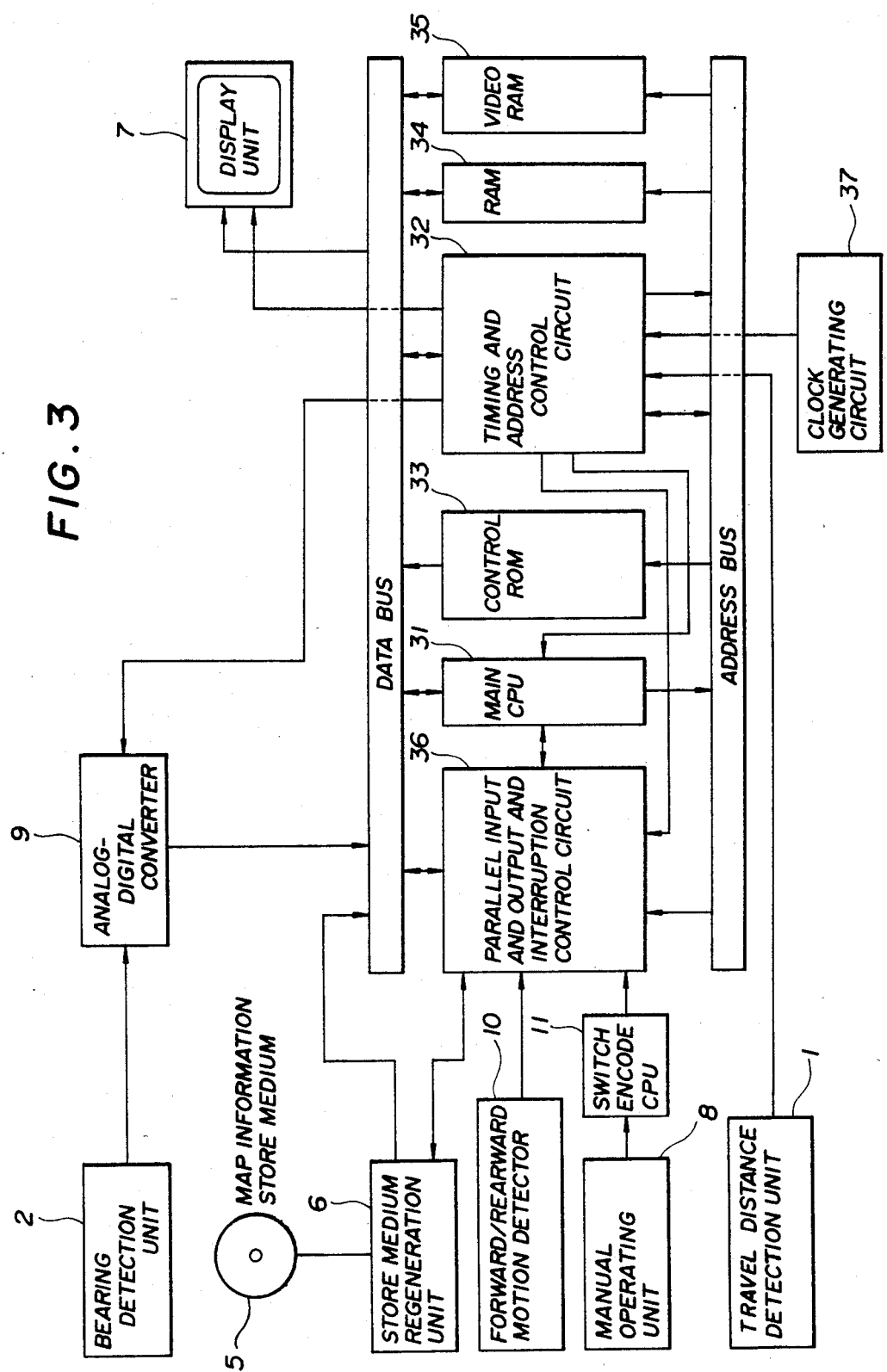
FIG. 3 is a block diagram showing a further detailed construction of the current location indicating apparatus by way of a practical construction.

More specifically, as typically shown in FIG. 2, the inputs to the display unit 7 from both the path of travel store unit 4 and the signal processing unit 3 are adapted to visually indicate by way of a specific road area map desired for the travel route on the display unit 7 by way of a mark M1 for indicating a current location of the automotive vehicle, a mark M2 for indicating a current travel direction of the vehicle at the current location thereof, and a mark M3 for indicating the current cumulated path of travel of the vehicle from the starting point up to the current location in a simulated tracing fashion, as the vehicle moves along its travel route, respectively. In this connection, the current location mark M1 and the bearing indication mark M2 may be combined in such a manner as to provide the current location of the vehicle with a due directivity thereof by itself, so that a combined indication of the current location and the current bearing indication of the vehicle may be obtained, instead of employing separate marks M1 and M2 as described hereinabove.

According to the typical construction of the invention, the signal processing unit 3 as shown in the present embodiment comprises a main CPU 31 which is adapted to provide the central control of the entire system, a timing and address control circuit 32 adapted to interpret the contents of a command fed from the main CPU 31 so as to generate a due timing clock signal for each control in synchronism with clock signals from a clock generating circuit 37, a control ROM 33 adapted to read out a due control program preliminarily stored in accordance with the control output from the address control circuit 32 and supply the read-out data to the main CPU 31, an RAM 34 adapted to store the locational data in terms of the two-dimensional coordinates in accordance with the detected values of the current travel distance and the current bearing of the vehicle, a video RAM 35 adapted to preliminarily store information such as a current location indicating mark, a current bearing indicating mark and a current path of travel indicating mark, and the map or geographic image information, and a parallel input and output and interruption control circuit 36 adapted to selectively connect the CPU 31 and the peripherals. The rate output from the bearing detection unit 2 is converted to digital value by means of an analog-digital (A/D) converter so as to be delivered to the data bus of the signal processing unit 3, and the pulse signal output of the travel distance detection unit 1 is fed to the timing and address control circuit 32 so as to be counted by the counter incorporated therein. Also, there is provided a detector 10 adapted to detect the forward and rearward motion of the automotive vehicle, which is particularly constructed such that when the vehicle moves in the rearward direction, the detection signal therefrom is fed to the parallel input-/output and interruption control circuit 36 in order to correct both the input and output from the travel distance detection unit 1 and the bearing detection unit 2, respectively, during the rearward motion of the vehicle. In addition, there is provided a switch encoding CPU 11 which is adapted to read the input condition in a bank of switches for the input operation at the operating unit 8 and deliver a variety of command signals to the parallel input/output and interruption control circuit 36.

In an exemplary arrangement in which the map or geographic information store unit 5 comprises an optical disc memory and the regeneration unit 6 comprises a laser disc type regeneration unit, it is possible to provide a compact storage of large capacity for storing a great amount of geographic information, and to provide a quick random access to such stored information, which is an optimal means for selecting a map of a desired area and showing same at the display unit 7 in the current location indicating apparatus according to the present invention. In this connection, the optical disc memory is compact in construction with facilitated handling, is highly exempt from dust or flaws in use, and has a very long service life by virtue of a non-contact reading type structure, which affords an excellent property for large capacity file memory. In this connection, it is also possible to provide a color indication system wherein there is provided a color (multicolored) display for the display unit 7, the geographic information is stored with a color specification pixel by pixel in the raster mode in the map information store unit 5, and wherein the current location indicating mark M1, the bearing indicating mark M2 and the path of travel indicating mark M3 are also specified with due desired colors, whereby there is presented a fully colored representation of a map as well as each of the marks M1, M2 and M3 on the screen of the display unit 7.

As an essential aspect of the current location indicating apparatus according to the present invention, there is provided the path of travel store unit 4 of a non-volatile storage type, which unit is arranged such that not only the continuous locational information on the vehicle but also the addressing information regarding the current map selection which is inputted from the manual operating unit 8 are stored in store unit 4 of the aforesaid type under the control of the signal processing unit 3, and also, the current bearing information of the vehicle changing from time to time with respect to the current location is stored sequentially while being updated. By virtue of such construction, even when the power supply is shut off to the entire system such as when switching off the engine ignition key of the vehicle, a current content of visual indication on the display screen of the display unit 7 can be safely and advantageously protected from volatilization. More specifically, when the engine ignition switch is turned off for the purpose of parking or the like along the course of travel, thus disconnecting the power supply from the entire system of the present location indicating apparatus of the invention, all information such as on a current addressing of a map of a selected area to travel along, a current cumulated path of travel, a current location and a current travel direction of the vehicle is safely secured in the non-volatile memory as set forth above. Therefore, when restarting the vehicle and switching-on the power supply to the entire system, the particular indication of the selected area map together with the current information on the state of travel of the vehicle immediately prior to turning-off of the power supply is resumed on the display screen in accordance with the stored contents of information under the control of the signal processing unit 3, whereby the continued visual indication of the travel state of the vehicle on the desired area map is shown on the display screen. In this arrangement, the stored contents in the non-volatile store unit may be cancelled by depressing the reset button provided at the manual operating unit 8, as desired.

With respect to the geographic or map information to be visually indicated on the display screen of the display unit 7, it is read out from the map information store medium 5 with respect to each piece of graphic image information corresponding to each unit area of a map which is divided in accordance with the desired scale of indication on the display screen as typically shown in FIG. 4, which construction is disadvantageous as set forth hereinbelow.

Figure 4:
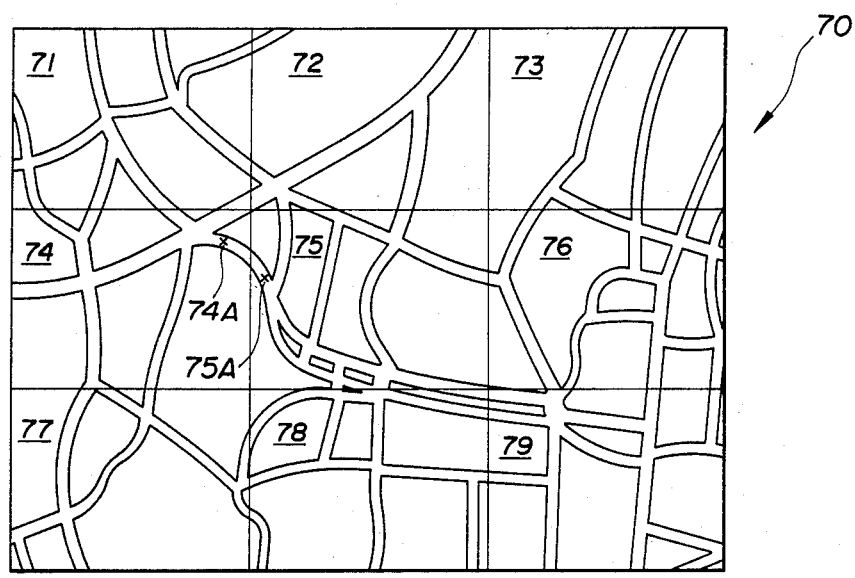
FIG. 4 illustrates a visual indication on the display screen showing a divisional fraction of a road map in accordance with the size of the screen.

If it is arranged, for example, as shown in FIG. 4 which shows a typical arrangement of the conventional display unit, that the graphic information on a map of an area 70 is to be stored in the store medium by dividing by the grid into nine individual fractional area maps 71 to 79 (each fractional area map being numbered respectively 71 through 79) respectively having a unit fractional size which corresponds to the screen size of the display unit 7, with a fractional area map 75 being shown on the display screen, and when the vehicle moves in its actual travel from a point 75A at the left end of the area map 75 on the display over to a point 74A in the map 74, the signal processing unit 3 recognizes that the vehicle's location shifts from the fractional area map 75 on the display over to the other fractional area map 74, whereupon it erases the fractional area map 75 from the display screen and reads out the due graphic information on the desired fractional area map 74 from the map information store medium 5 through its regeneration unit 6 so that this new information is visually indicated on the display unit 7, together with the locational indicating marks relating to the current location of the vehicle being indicated.

According to such operation, the location indicating marks are shifted on the display screen following the actual travel motion of the vehicle, and when they reach a position near the border edge of the display screen, the fractional area map being presented on the display screen will not be changed to the adjacent one unless these marks exit from or step over the border edge of the display screen. Consequently, it will be understood that any information such as on the peripheral areas adjacent and forward of the current path of travel of the vehicle which is to be taken thereby cannot be made available for a visual indication on the display screen. This situation is inconvenient for the driver of the vehicle because no detailed information can be provided in advance for such adjacent area to be travelled by the vehicle.

Figure 5:
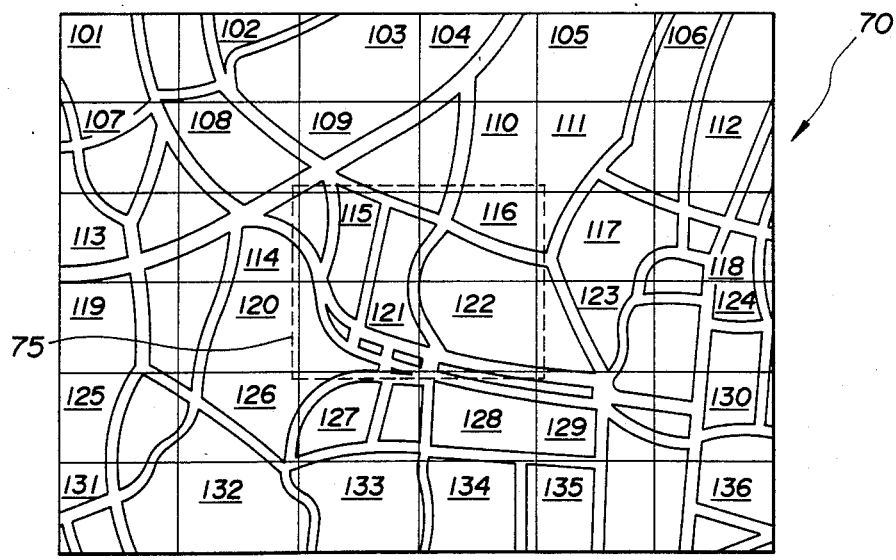
FIG. 5 illustrates an enlarged indication on the display screen showing a divisional fraction of a road map in a quarter scale of the total area of the display screen.

In contrast, according to an advantageous feature of the present invention to be described hereinbelow, there is provided switching means for a series of component maps to be displayed on the screen of the display unit. As described hereinabove, the graphic information on the series of component maps is stored in the map information store medium 5, in a storage manner as typically shown in FIG. 5 such that the whole map 70 is divided by the grid in terms of the graphic information into the component maps having a size corresponding to a quarter of the total area of the display screen of the display unit 7, taking each component map as a unit to be stored with an individual number thereof. According to such arrangement of storing the graphic information in a divided manner, when preliminarily preparing a map of an area desired for a trip to be indicated on the display screen of the display unit 7, for instance, taking the map of an area surrounded with a broken line 75 to be displayed, it is required to read out component maps numbered 115, 116, 121 and 122 adjacent each other and constituting the area 75 from the map information store medium 5 to be stored preliminarily in the signal processing unit 3, in such a manner that these component maps may be prepared for the visual indication on the screen of the display unit 7. More specifically, there are now prepared four component area maps adjacent each other comprising the screen size (as shown with the broken line 75) of the display unit 7, thus constituting the whole map area to be displayed, and the control as to which set of the component maps is selected to be read out as to be displayed on the screen is made by the operation of the signal processing unit 3 which follows the algorism based on a reference such as will be described in detail hereinbelow.

Figure 6:
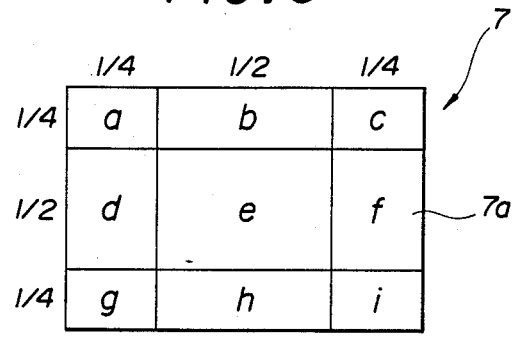
FIG. 6 is a view showing the manner of division of the display screen to be displayed at a given time.

Next, the algorism for the procedures of preparing and switching the road map to be shown on the screen of the display unit 7 will be described. Firstly, the display screen of the display unit 7 is divided by the grid into nine fractional areas a through i as typically shown in FIG. 6, and such divisional map areas are set accordingly in the control program for the signal processing unit 3. In FIG. 6, the values of fractions as plotted along the ordinate and abscissa represent the due ratio of division to define the fractional areas a through i. By dividing the display screen 7a of the display unit 7, it is arranged by way of programming to determine in which of the fractional areas a through i the mark relating to the current travel location exists, when displaying the current location of the vehicle as obtained from the arithmetic operation in the signal processing unit 3 on the screen of the display unit 7.

Figure 7:
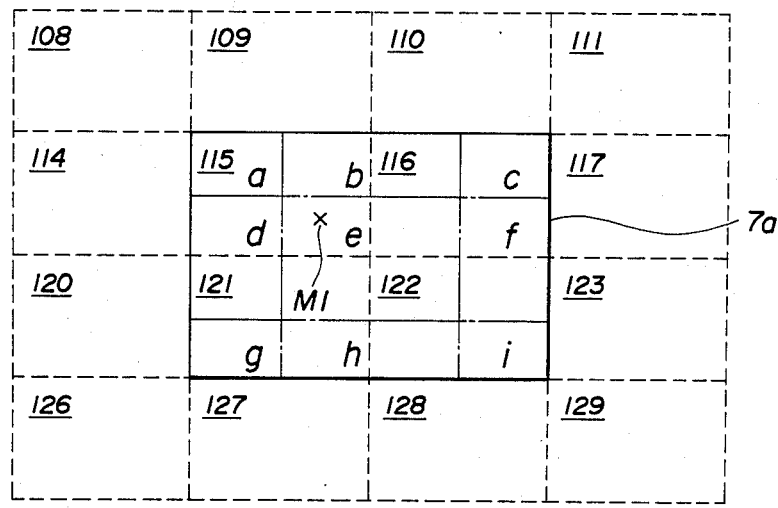
FIG. 7 is a view showing the manner in which a series of divisional maps are shifted from one to another for visual indication on the display screen.

As typically shown in FIG. 7, it is assumed that there is prepared and shown the map comprising the component maps 115, 116, 121 and 122 on the screen area 7a of the display unit 7, and that there are shown in duplication the nine divided areas a through i of the screen area 7a corresponding to those shown in FIG. 6 onto the component maps 115, 116, 121 and 122, respectively. The other component maps 108 through 111, 114, 117, 120, 123 and 126 through 129 are also shown in the Figure as fractional areas of the whole map, which component maps are located adjacent the component maps 115, 116, 121 and 122, respectively, thus forming a single map as a whole, but in the actual presentation on the display, the component maps 115, 116, 121 and 122 are shown on the display screen 7a, while all others are left stored as digital information in the memory of the map information store medium 5 and the signal processing unit 3.

As described hereinabove, the current location indicating mark M1 as shown on the screen of the display unit 3 is obtained as a value on the two-dimensional coordinates, which mark M1 can be properly located in one of the fractional areas a through i of the screen area 7a. Therefore, the operation of the signal processing unit 3 is programmed to select one of the sets, each composed of four component area maps, to be displayed on the screen 7a of the display unit 7 in accordance with the following reference of selection.

Figure 8:
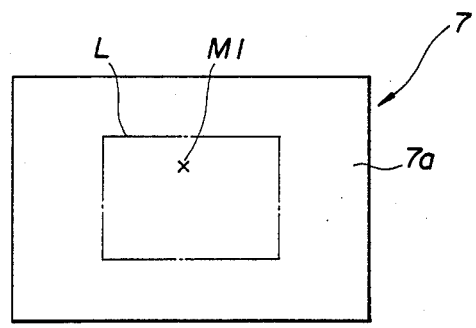
FIG. 8 is a schematic view showing the area of visual indication of a current location of the automotive vehicle on the display screen.

It is generally arranged that if the mark M1 exists within the central fractional area e, the component maps 115, 116, 121 and 122 are to be indicated on the display; if it is within the area a, the component maps 108, 109, 114 and 115 are indicated; if within the area b, the component maps 109, 110, 115 and 116 are indicated; if within the area c, the area maps 110, 111, 116 and 117 are indicated; if within the component d, the component maps 114, 115, 120 and 121 are indicated; if within the area f, the component maps 116, 117, 122 and 123 are indicated; if within the area g, the component maps 120, 121, 126 and 127 are indicated; if within the area h, the component maps 121, 122, 127 and 128 are indicated; and if within the area i, the component maps 122, 123, 128 and 129 are visually indicated, respectively. In this respect, therefore, as long as the mark M1 moves within the scope of the central area e of the screen area 7a of the display unit 7, there is a continued indication of the component maps 115, 116, 121 and 122, while as the mark moves from the center area e into one of the peripheral areas, a, for instance, the component maps 115, 116, 121 and 122 are removed from the screen area 71, and there appear the component maps 108, 109, 114 and 115 in the fashion as shown on the screen area 7a. This manner of changing the individual component maps in accordance with the travel of the mark M1 to other divisioned areas would likely bring any one of the set of four component maps on the screen area, as described hereinabove. The set of component maps is accordingly shifted from one to the other to be displayed on the screen area 7a in accordance with the current locational change of the mark M1. More specifically, with such shifting of the set of component maps, it is arranged that the mark M1 will always stay within the central area e in the screen area 7a of the display unit. As typically shown in FIG. 8, it is arranged that the mark M1 which relates constantly to the current location of the vehicle would not step out of the area L (the same as the central area e) which is located in the center of the screen 7a of the display unit, and thus one of the four component maps to which the mark M1 belongs is left displayed on the screen area 7a, while the remaining three component maps are replaced with another three which are required for the subsequent indication.

Figure 9:
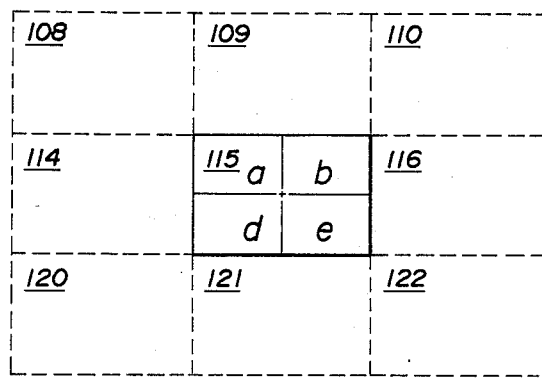
FIG. 9 is a view similar to FIG. 8 showing the specific area of a road map to be divided into several fractions for visual indication on the display screen.

The general construction of the component map shifting system as exemplified above may be conceived in the following manner. According to the arrangement of the component maps 108 to 110, 114 to 116 and 120 to 122, as typically shown in FIG. 9, and assuming that the mark M1 showing the current location of the vehicle exists in the component map 115, the current set of component maps to be shown in combination on the screen of the display unit 7 is accordingly determined depending upon in which quadrant divisional areas a, b, d and e of the component map 115 this mark exists, in such manner that if the mark M1 exists in the fractional area a, component maps numbered 108, 109, 114 and 115 are assessed in combination; if in the area b, component maps 109, 110, 115 and 116 are combined; if in the area d, component maps 114, 115, 120 and 121 are combined; and if in the area e, component maps 115, 116, 121 and 122 are assessed in combination so as to be displayed on the screen, respectively. In order to practice such set of component maps shifting system by way of the signal processing unit 3 according to the present invention, digital graphic information relating to the road map is preliminarily divided into the component maps and stored in the map information store medium 5 in such manner that such a component map may correspond in its area to a quarter of the screen area of the display unit 7 with each of the vertical and horizontal sides of the screen area being halved accordingly, and further subdividing the digital graphic information of the component map into four equal divisions or fractions under the control program stored in the signal processing unit 3. It is also arranged that the signal processing unit 3 can constantly determine in which subdivisioned area the current location of the vehicle exists.

By virtue of such construction wherein the mark M1 relating to the current location of the vehicle displayed on the display unit 7 may constantly exist in the central area of the display screen, so that when the mark M1 enters in a proper position of the display screen, the related component map remains on the display while shifting the set of other component maps relating to and surrounding this particular component map so as to constitute the complete continuous set of component maps on the display, the driver of the vehicle can advantageously readily recognize the current location of his vehicle, which is constantly displayed in the central area of the display screen while the relating and surrounding set of component maps are shifted as the vehicle progresses in its travel route on the display screen of the display unit 7.

Further, in connection with the visual indication of a current status of travel of the vehicle on the road map presented on the screen of the display unit 7, by way of another aspect of the present invention the road map shown on the screen is rotated appropriately so that the direction of the moving vehicle along its path of travel at the current location as shown by the mark M2 (see FIG. 2) may point upwardly in the display so as to coincide with the current actual heading direction of the vehicle, which facilitates review by the driver of the actual geographical features and so on of the road in comparison with the current visual indication on the display referring to the current state of travel of the vehicle.

Figure 10:
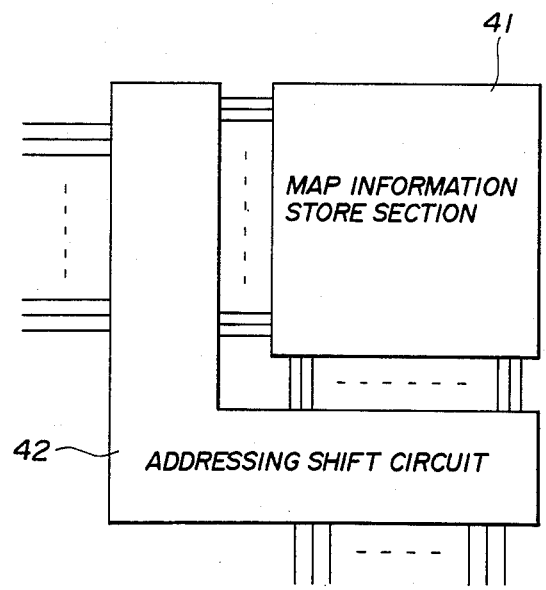
FIG. 10 is a schematic view showing a typical embodiment of the means for rotating a map currently indicated on the display screen.
Figure 11:
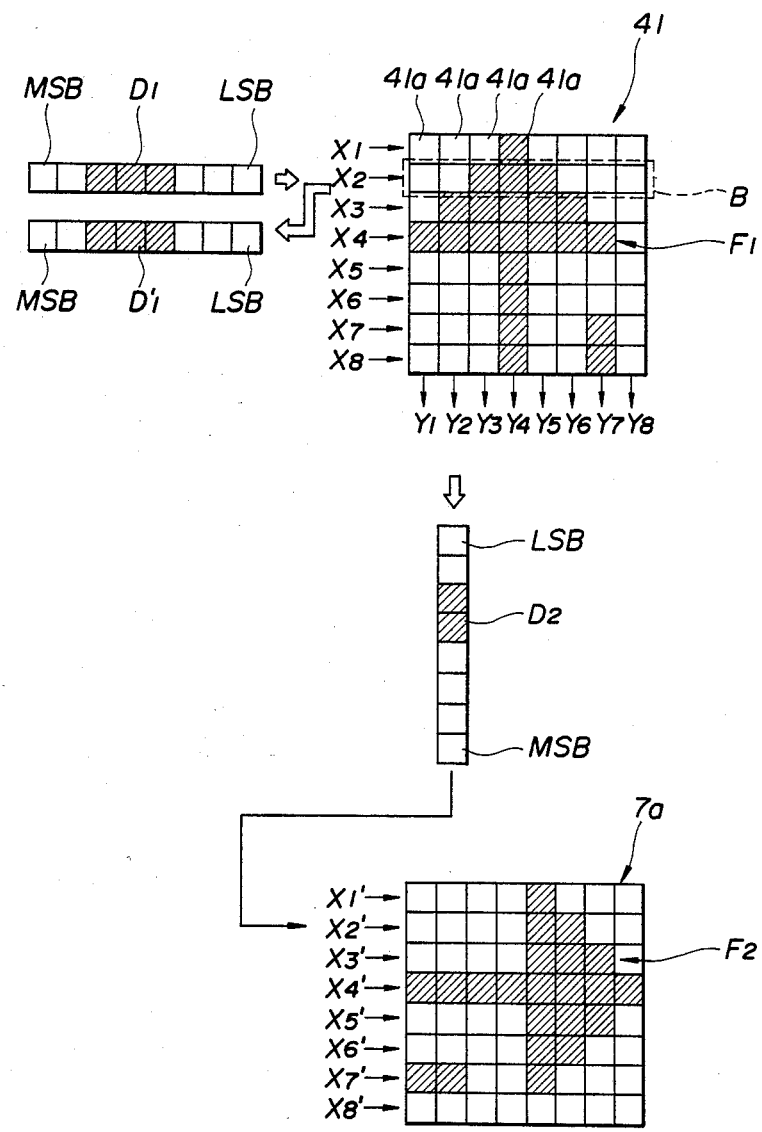
FIG. 11 illustrates the principle of having an area map on the display rotated 90 degrees in the clockwise direction as desired.

Referring now to FIG. 10 which shows a typical arrangement of means for rotating the area map shown on the screen of the display unit 7 according to a change from time to time in the heading of the automotive vehicle, there is provided a store section 41 which is adapted to store dot by dot the map or geographic information in a matrix fashion, and an addressing shift circuit 42 which is adapted to shift a current addressing of the row and column of the dot matrix according to a current change of heading of the vehicle, when reading from the store section 41 the current geographic information concerning the area map on the display under the control of the main CPU in the signal processing unit 3. According to the employment of the raster mode system for the visual indication of a road map on the screen of the display unit 7, there is provided a video sigal RAM 35 of such a construction that a single bit signal corresponding to each pixel of a picture on the display is properly arranged to define a bit image to be stored accordingly. For instance, the store section 41 comprises a plurality of memory elements 41a, ... in a matrix fashion, and for the sake of clarity of the present embodiment of the invention, the matrix is, for example, shown comprising eight rows and eight columns, as shown in FIG. 11. In this arrangement, for convenience of illustration, each memory element 41a of the store section 41 in the state of logic "1" is shown with a hatched square, and is shown with a white or blank square in the state of logic "0". Accordingly, for example, a configuration or graphic pattern $F_1$ as shown comprising a plurality of bits as a graphic image is to be stored in the store section 41 to be displayed.

With respect to the relationship between the store section 41 and the display screen 7a of the display unit 7 by way of the illustration as shown, by virtue of the raster mode employed for the display system of the invention as described hereinabove, wherein each physical element comprising the display screen and each memory element 41a of the store section 41 are arranged correspondingly with each other, when reading the memory content from the store section 41 to be displayed according to the ordinary practice, it is known that there is presented the same configuration or graphic image to be visually displayed as the pattern $F_1$ as the bit pattern which is stored in the store section 41.

Assuming, as shown in FIG. 11, that the row of the matrix is designated at Xi (where i=1 through 8), the column being designated at Yi (where i=1 through 8), according to common practice the store unit 41 is arranged by means of an addressing circuit in such a manner that 8-bit data $D_1$ is to be stored in the address $X_2$ when writing-in (shown as the state B), it being read again in the like manner (shown as $D'_1$) with the data $D_1$ before being written from the address of $X_2$ when in a reading step. In this arrangement, it is to be assumed that the reading is to be practiced starting in the order from the most significant bit (hereinafter referred to as "MSB") down to the least significant bit (hereinafter referred to as "LSB"), in the following description with respect to the writing, reading and displaying procedures, as well. In this manner, therefore, any graphic pattern as stored like the pattern $F_1$ in the store section 41 with the employment of each of the addesses Xi (i=1 through 8) may be transferred with the like pattern to the display unit 7 so as to be displayed on the display screen thereof by using the same address.

In addition to the procedures described hereinabove, it is possible in practice to provide such an advantageous shift operation according to this particular addressing shift circuit 42 according to the present invention, as follows.

It is to be noted that a first addressing shift operation is to write in data from the addresses Xi (i=1 through 8), and to read out data from the addresses Yi (i=1 through 8). According to such arrangement, as typically shown in FIG. 11, a data $D_1$ which is written into the address $X_2$, for instance, is to be read out from the address $Y_2$ like a data $D_2$, subsequently to be displayed by way of each pixel in the line of $X'_2$ of the screen 7a of the display unit 7, such procedures of writing and reading being conducted with each of the rows and columns so as to be displayed on the display screen (the designation "i's" being identical with the addresses Yi and X'i, respectively), thus presenting a graphic pattern $F_2$ on the display screen. The thus-obtained pattern $F_2$ is the same one as the pattern $F_1$ which was originally stored in the store section 41 and then rotated 90 degrees clockwise.

Figure 12:
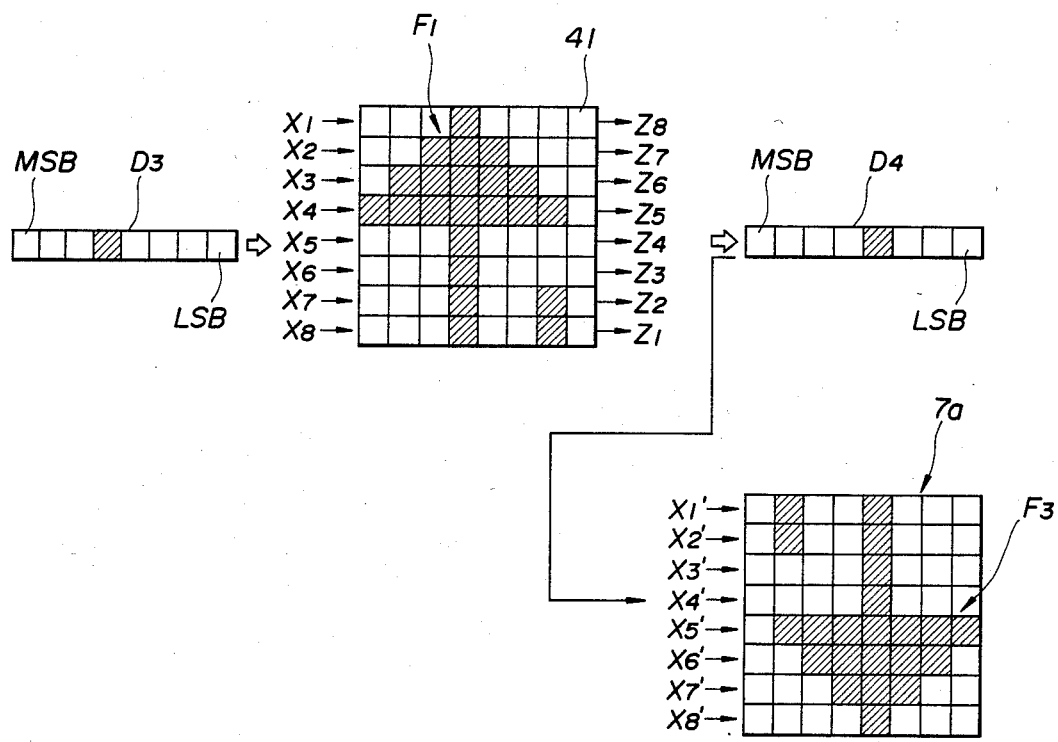
FIG. 12 illustrates the principle of having the map on the display rotated 180 degrees in the clockwise direction when so required.

As shown in FIG. 12, a second addressing shift operation resides in writing the data from the addresses Xi (i=1 through 8), and to read out data from the addresses Zi (i=1 through 8), respectively. With this construction, it is arranged such that a data $D_3$ which was written into the address $X_5$, for example, is to be read out from the address $Z_4$ like the data $D_4$, subsequently to be displayed in each of the pixels in the row $X'_4$ of the screen 7a of the display unit 7, such procedures of writing and reading being conducted in each of the rows and columns so as to be displayed on the display screen (the designation "i's" being identical with the addresses Zi and X'i, respectively). Consequently, there is displayed a pattern such as $F_3$ on the display screen. Such graphic pattern $F_3$ is the same one as the pattern $F_1$ originally stored in the store section 41 and then rotated 180 degrees clockwise.

Further to the addressing shift circuit 42 equipped with the function as described hereinabove, it is also possible in practice to rotate the graphic pattern $F_1$ 90 degrees or 180 degrees counterclockwise in the same manner as in the embodiment desribed hereinabove.

In operation of the current location indicating apparatus of an automotive vehicle according to the present invention, particularly when a certain map or geographic image is displayed on the screen 71 of the display unit 7, for example, and when the vehicle actually makes a turn to the left by 90 degrees in the forward direction, it is now required to also turn the whole area map 90 degrees clockwise accordingly, and more specifically, by operation of the main CPU 31 in the signal processing unit 3, the image indication on the display screen is once cleared in response to such turning motion of the vehicle, and the addressing shift circuit 42 is operated to resume the geographic image presentation which has been turned by an angle corresponding to the azimuthal deviation of the vehicle caused by such turning motion thereof on the screen of the display unit 7.

In this manner, by virtue of the mere provision of the advantageous addressing shift circuit 42 which can change the combination of the data bits at the time of writing and reading with respect to the store section 41, it is now possible in practice, without any special program for the rotation of an area map on the display, to provide the advantageous capability of rotating the map to be displayed on the screen of the display unit 7 in accordance with a current change in the travel direction of the vehicle under the control of the main CPU 31. In this connection, it will of course be understood that such means for rotating the graphic image on the display can be applied not only to use in the current location indicating apparatus for the automotive vehicle, but also to the general display art relating to a graphic image indicating system under the control of a computer.

In summary, according to the present invention, there is provided an improved current location indicating apparatus for use in an automotive vehicle constructed such that there is provided the current travel distance detection unit adapted to detect the current cumulated travel distance of the vehicle, the bearing detection unit adapted to detect a current bearing or heading of the vehicle following the current travel distance of the vehicle, the signal processing unit adapted to obtain a current locational point in terms of two-dimensional coordinates of the moving vehicle in accordance with the outputs from the detection units and to control the entire system, the path of travel store unit adapted to sequentially store the locational data in terms of the two-dimensional coordinates varying from time to time which are obtained from the signal processing unit and hold the contents thereof as current continuous locational information on the moving vehicle, the map or geographic image information store medium adapted to preliminarily store the map information prepared pixel by pixel in the raster mode, the store medium regeneration unit adapted to read out the required map information from the store medium, the display unit adapted to visually indicate a current map or geographic image in accordance with the current read-out map information and display with a marking showing the state of travel of the vehicle on the same display screen in accordance with the locational data stored in the path of travel store unit, and the manual operating unit adapted to selectively specify as area map desired to be shown on the display screen of the display unit and properly initialize the marking of indication on the display. There are thus attained the advantageous features such that without the necessity of manual setting of any physical transparent map sheet, a number of which are required to be prepared in advance, it is possible to directly indicate a road map of an area desired for travel together with the visual marking relating to the current state of gravel of the vehicle, thus making it possible for the driver of the vehicle to positively and accurately immediately determine the current state of travel of the vehicle upon the simulated geographic presentation on the screen of the display unit in front of the driver's seat.

Moreover, according to another aspect of the present invention, by virtue of the provision of the non-volatile memory unit for the store system in the path of travel store unit, which memory can also store the addressing information relating to the selection of the area map to be displayed, there is attained the advantageous feature that the stored current locational indication of the vehicle can immediately be resumed upon re-starting of the vehicle, even once the power supply to the memory unit has been shut off.

It is now clear that the objects as set forth hereinabove among those made apparent from the preceding description are efficiently attained, and because certain changes and modifications may be made in the foregoing description without departing from the spirit and scope of the invention, it is intended that all matter contained in the foregoing description and shown in the accompanying drawings shall be interpreted as illustrative and not in any manner as limiting.

It is also to be understood that the appended claims are intended to cover all of such generic and specific features particular to the invention as disclosed herein and all statements relating to the scope of the invention, which has a matter of language might be said to fall thereunder.

I claim:

1. A current location indicating apparatus for use in an automotive vehicle, comprising:

current travel distance detection means for detecting a current cumulated travel distance of the vehicle;

bearing detection means for detecting a current bearing or heading of the vehicle following the current travel distance of the vehicle;

signal processing means for obtaining a current locational data in terms of two-dimensional coordinates of the moving vehicle in accordance with the outputs from both said detection means while controlling the entire system;

path of travel store means for sequentially storing the locational data in terms of the two-dimensional coordinates varying from time to time which are obtained from said signal processing means and holding the contents thereof as current continuous locational information on the moving vehicle;

display means having a display screen;

map or geographic image information store medium means for preliminarily storing map information about an image of a map, said map being divided by a grid into component maps having a size thereof corresponding to a quarter of the total area of said display screen, said map information being prepared pixel by pixel in the raster mode with respect to respective said component maps;

store medium regeneration means for reading out said map information from said store medium means;

said signal processing means controlling said display means so as to indicate visually a map or geographic image in accordance with the current read-out map information and to display with a marking showing the state of travel of the vehicle on said display screen in accordance with the locational data stored in said path of travel store means;

said signal processing means controlling said store medium regeneration means to read out said map information with respect to at least four of said component maps which are selected by said signal processing means in accordance with current locational change of said marking in such a manner that said marking may constantly exist within a central area of said display screen; and manual operating means connected to said signal processing means for giving commands to said signal processing means so as to selectively specify an area map desired to be shown on said display screen of said display means and properly initialize said marking on said display screen.

2. A current location apparatus according to claim 1, further comprising:

map rotation means cooperating with said signal processing means for rotating said area map shown on said display screen according to a change in the heading of said vehicle; and said map rotation means comprising a store section means adapted to store dot by dot said map information in a matrix fashion, and an addressing shift circuit means for shifting a current addressing of the row and column of said matrix according to the change of heading of the vehicle.

3. A current location apparatus according to claim 2, wherein:

said path of travel store means is of a non-volatile storage type whereby a current content of visual indication on said display screen can be safely and advantageously protected from volatilization even when power supply to said location indicating apparatus is cut off.

* * * * *

UNITED STATES PATENT AND TRADEMARK OFFICE
CERTIFICATE OF CORRECTION

PATENT NO. : 4,660,037
DATED : April 21, 1987
INVENTOR(S) : Yukinobu NAKAMURA

It is certified that error appears in the above-identified patent and that said Letters Patent is hereby corrected as shown below:

```
Column 8, line 59, change "algorism" to --algorithm--;
         line 61, change "algorism" to --algorithm--.
Column 11, line 28, correct the spelling of --signal--.
Column 13, line 58, change "gravel" to --travel--.
```

Signed and Sealed this

Sixth Day of October, 1987

Attest:

DONALD J. QUIGG

Attesting Officer

Commissioner of Patents and Trademarks